(No Model.)
F. J. HERRICK.
BOOT TREE.
No. 437,815. Patented Oct. 7, 1890.
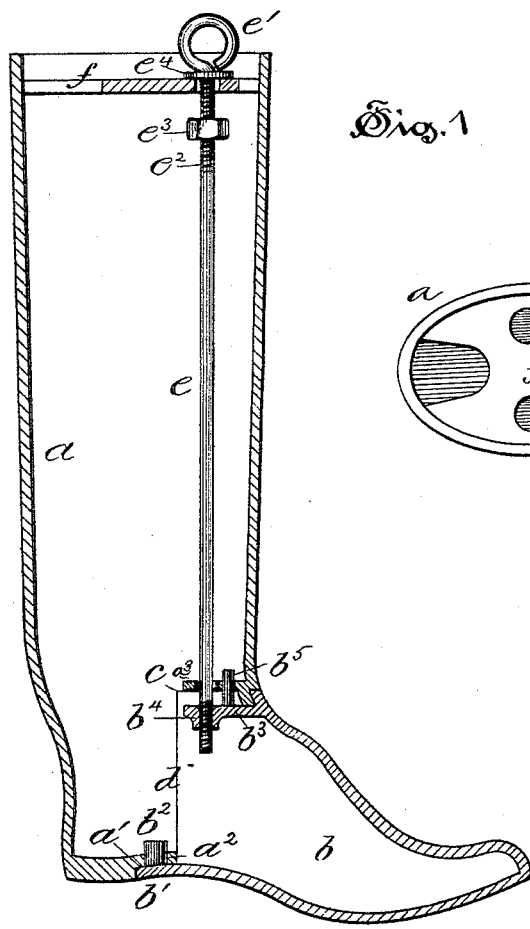
Fig. 1
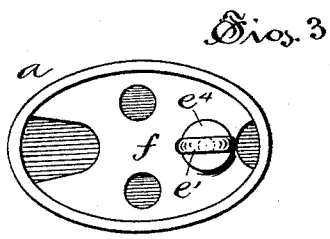
Fig. 3
Fig. 2
Witnesses:
Harry R. Williams.
Arthur P. Jenkins.
Inventor,
Frank J. Herrick,
by Simonds & Burdett,
Attys

UNITED STATES PATENT OFFICE.

FRANK J. HERRICK, OF NEW BRITAIN, CONNECTICUT, ASSIGNOR TO THE NORTH & JUDD MANUFACTURING COMPANY, OF SAME PLACE.

BOOT-TREE.

SPECIFICATION forming part of Letters Patent No. 437,815, dated October 7, 1890.

Application filed December 20, 1889. Serial No. 334,410. (No model.)

*To all whom it may concern:*

Be it known that I, FRANK J. HERRICK, of New Britain, in the county of Hartford and State of Connecticut, have invented certain new and useful Improvements in Boot-Trees, of which the following is a full, clear, and exact description, whereby any one skilled in the art can make and use the same.

The object of my invention is to provide a simple and compact form of boot-tree adapted especially for use in the manufacture of rubber boots and having a removable foot portion to facilitate the removal of the newly-formed boot from the tree.

My invention consists in the details of the several parts making up the tree as a whole and in their combination, as more particularly hereinafter described, and pointed out in the claims.

Referring to the drawings, Figure 1 is a view in central vertical section of a tree embodying my invention. Fig. 2 is a detail bottom view of the tree. Fig. 3 is a detail top view.

In the accompanying drawings, the letter $a$ represents the leg portion of the tree, and $b$ the foot portion, these parts being preferably made of iron and cast to shape with walls of the proper thickness to render the tree durable and serviceable. These sections of the tree are separated on a plane $c$ just above the instep and the plane $d$, extending lengthwise of the tree just in front of the heel portion and intersecting the plane $c$, as denoted in Fig. 1 of the drawings. The two sections or portions $a$ and $b$ are held together by interengaging locking parts and a screw-rod $e$ in the form of engaging parts shown in the drawings. The foot portion $b$ has a tongue $b'$ at the back of the sole that fits into a socket $a'$ on the under side of the heel, and the lug or pin $b^2$ on the foot portion extends through a hole in the overhanging part $a^2$ of the heel in the leg portion $a$ of the tree.

On the foot portion $b$ and above the instep is a bracket $b^3$, preferably cast integral with the foot portion, and a threaded socket $b^4$ is formed to receive the threaded end of the rod $e$ in this bracket. A pin $b^5$ extends upward from the bracket in such position that it fits into a hole or socket in an inwardly-projecting lug or bracket $a^3$ on the leg portion of the tree.

The rod $e$ is provided at its upper end with a handle $e'$, preferably formed in shape of an eye, as represented in the drawings, and it extends through a crosswise support $f$, that is secured near the top of the leg portion of the tree. The upper end of the rod $e$ is threaded, as at $e^2$, and on this upper portion there is arranged a nut $e^3$. A washer $e^4$, borne on the rod, rests on the upper part of the support $f$, while the nut $e^3$ is arranged at a suitable distance below the under side of the support $f$ to enable the rod $e$ to be unscrewed from the socket $b^4$ in the foot portion, so as to enable the latter to be withdrawn from the leg portion of the tree in removing the boot from the latter. The lock-nut $e^3$ is of advantage in allowing the rod $e$ to serve its function as a clamping or attaching means for holding the leg and foot sections of the tree together, and also as a means for supporting the tree in withdrawing the leg portion from a boot. When the parts are clamped together, as in the position shown in Fig. 1 of the drawings, the rod affords a rigid and secure means for supporting the tree in position while treating the rubber boot in the practice of my invention. The engaging means between the foot and leg portions of the tree, it will be noticed, are so formed and located with respect to each other that they are held against any chance of lateral or vertical play, while the two sections are readily engaged or disengaged by a movement in the direction lengthwise of the leg portion of the tree when the rod $e$ is unscrewed.

I claim as my invention—

1. In combination, in a boot-tree, a leg portion and a foot portion removably secured to each other by interengaging parts, and the lengthwise-movable rod $e$, supported in the leg portion, provided with a collar above and an adjustable lock-nut below the upper support of the rod, and having a threaded end fitting into a threaded socket in the foot portion of the tree, all substantially as described.

2. In a boot-tree, in combination with the leg portion $a$, having the rod-supports $f$ and $a^3$, the pins $b^2$ and $b^5$, projecting upward from the foot-section, the pin-sockets formed in the leg portion to receive said pins, the clamping-rod $e$, having a threaded end fitting a threaded socket $b^4$ in the foot-section, the upper end having a washer located above the rod-support and a lock-nut borne on the threaded part of the rod below the rod-support, and the rod-support, all substantially as described.

FRANK J. HERRICK.

Witnesses:
CHAS. L. BURDETT,
A. B. JENKINS.